United States Patent
Morgan et al.

[11] Patent Number: 5,882,367
[45] Date of Patent: Mar. 16, 1999

[54] ROTATABLE SEALED FILTER OUTLET

[75] Inventors: Jeffrey S. Morgan; Mark V. Holzmann, both of Stoughton; Kent J. Kallsen, Madison, all of Wis.

[73] Assignee: Nelson Industries, Inc., Stoughton, Wis.

[21] Appl. No.: 883,047

[22] Filed: Jun. 26, 1997

[51] Int. Cl.$^6$ ................................................. B01D 39/00
[52] U.S. Cl. .............................. 55/495; 55/502; 55/505; 55/507; 55/510
[58] Field of Search ...................... 55/490, 495, 498, 55/502, 505, 507, 510

[56] References Cited

U.S. PATENT DOCUMENTS

| | | |
|---|---|---|
| 2,962,121 | 11/1960 | Wilber . |
| 3,078,650 | 2/1963 | Anderson et al. . |
| 3,147,100 | 9/1964 | Wilber . |
| 3,169,844 | 2/1965 | Young . |
| 3,201,927 | 8/1965 | Wachter . |
| 3,745,753 | 7/1973 | Risse . |
| 4,135,899 | 1/1979 | Gauer . |
| 4,491,460 | 1/1985 | Tokar . |
| 4,720,292 | 1/1988 | Engel et al. . |
| 5,160,519 | 11/1992 | Svensson et al. . |
| 5,167,683 | 12/1992 | Behrendt et al. . |
| 5,547,480 | 8/1996 | Coulonvaux . |

FOREIGN PATENT DOCUMENTS

| | | | |
|---|---|---|---|
| 1131647 | 2/1957 | France . | |
| 2261041 | 12/1975 | France . | |
| 1925579 | 9/1970 | Germany | .................................. 55/510 |
| 55-60653 | 5/1980 | Japan | ...................................... 55/505 |
| 59-141150 | 9/1984 | Japan . | |
| 1499922 | 2/1978 | United Kingdom . | |
| 2110110 | 6/1983 | United Kingdom . | |

*Primary Examiner*—Jay H. Woo
*Assistant Examiner*—Robert Hopkins
*Attorney, Agent, or Firm*—Andrus, Sceales, Starke & Sawall

[57] ABSTRACT

An improved outlet tube (60) is provided for an air filter (10) of the type including a housing (12) having distally opposite axial ends (14 and 16), and a cylindrical filter element (34) in the housing (12), the cylindrical filter element (34) having an annular sidewall (40) with a hollow interior (58) and extending between distally opposite axial ends (48 and 50), wherein air flows radially inwardly through the annular sidewall (40) into the hollow interior (58) and then axially through the hollow interior (58). The outlet tube (60) is mounted to the axial end (14) of the housing (12) in snap-in relation and is rotatable relative thereto about the axis (62) of the cylindrical filter element (34) and communicates with the hollow interior (58) of the cylindrical filter element (34) for exhausting clean filtered air therefrom (64, 66). A seal (70) provides both axial and radial sealing of the outlet tube (60) to the housing (12), and seals the housing/outlet tube joint and allows the filter element (34) to seal both radially and axially with the housing/outlet tube assembly.

26 Claims, 3 Drawing Sheets

5,882,367

ROTATABLE SEALED FILTER OUTLET

BACKGROUND AND SUMMARY

The invention relates to air filters, including for internal combustion engines on trucks.

Air filters for trucks are known in the prior art, and typically include a cylindrical housing having distally opposite axial ends, and a cylindrical filter element in the housing, the filter element having an annular sidewall with a hollow interior and extending between distally opposite axial ends. Air flows radially inwardly through the annular sidewall of the filter element into the hollow interior and then axially through the hollow interior and exits the housing. The present invention relates to improvements to an outlet tube mounted to one of the axial ends of the housing for exhausting the clean filtered air.

DETAILED DESCRIPTION OF THE INVENTION

Figure 1:
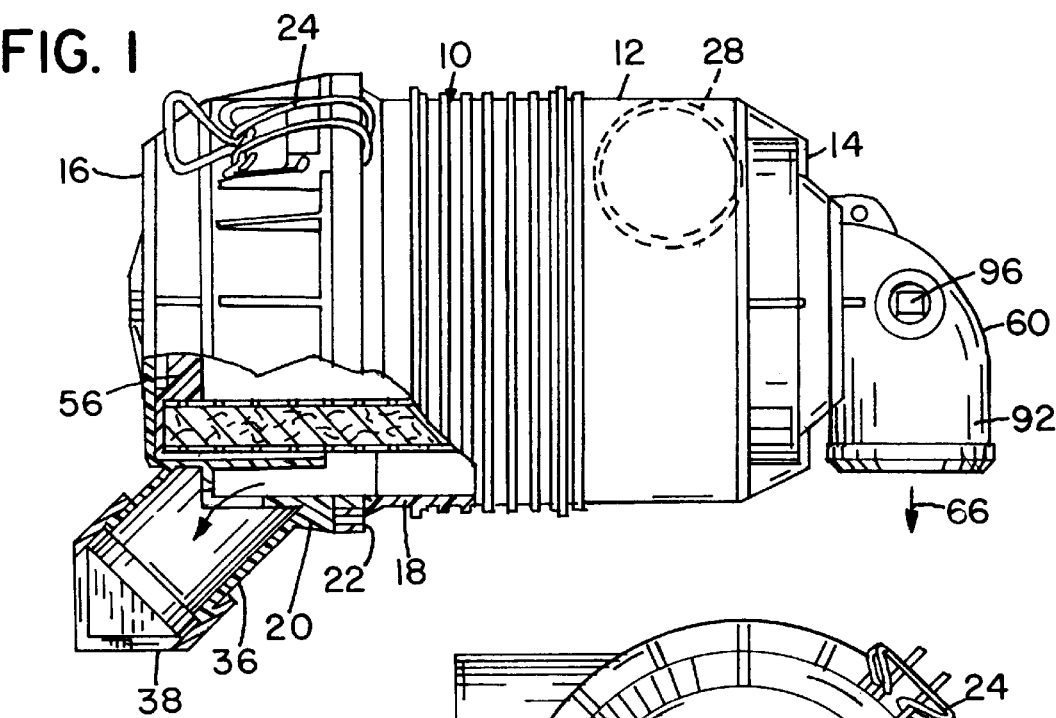
FIG. 1 is a side elevation view of an air filter constructed in accordance with the invention.
Figure 2:
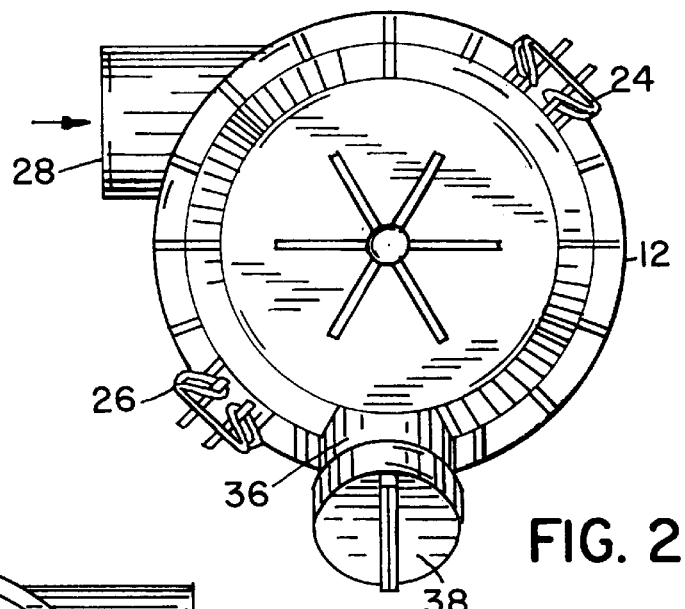
FIG. 2 is an end elevation view of the filter of FIG. 1.
Figure 3:
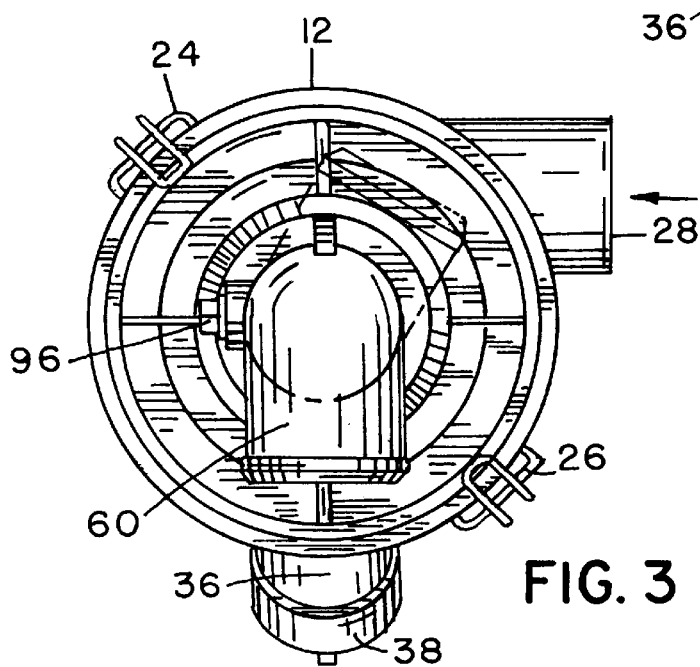
FIG. 3 is an opposite end elevation view of the filter of FIG. 1.
Figure 6:
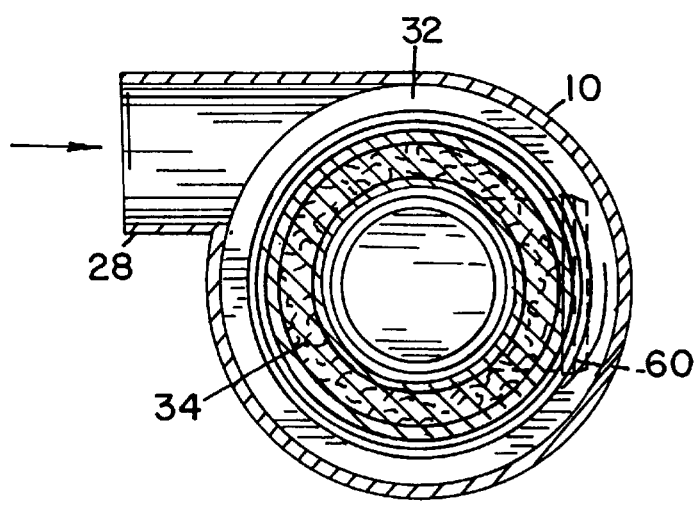
FIG. 6 is a sectional view taken along line 6—6 of FIG. 4.

FIG. 1 shows an air filter 10 including a generally cylindrical plastic housing 12 having distally opposite ends 14 and 16. The housing is provided by first and second sections 18 and 20 engaging each other at tongue and groove interface 22 and mounted to each other by clamps 24 and 26, FIGS. 1–3. The housing has an air inlet opening 28, FIGS. 2 and 3, admitting air into the housing against a deflector plate 30, FIG. 4, which directs the air into the annular space 32, FIG. 4 and 6, around the outer periphery of cylindrical filter element 34 in the housing. The housing has a drain outlet 36, FIG. 1, closed by dust ejector valve 38, as is known. Cylindrical filter element 34 in the housing has an annular sidewall 40 provided by filter media 42 between inner and outer wire mesh liners 44 and 46 extending between distally opposite axial ends 48 and 50. End 48 is capped by a soft rubber annular cap 52. End 50 is, capped by a soft rubber annular cap 54 which also includes a central web or disc portion 56 spanning the hollow interior 58 of filter element 34 and closing the left end thereof as viewed in FIGS. 4 and 1. Air flows through air inlet opening 28 into housing 12, into annular space 32, and then flows radially inwardly through annular sidewall 40 of filter element 34 into hollow interior 58 and then axially rightwardly through hollow interior 58 as viewed in FIG. 4. The above described structure is known in the prior art.

Figure 4:
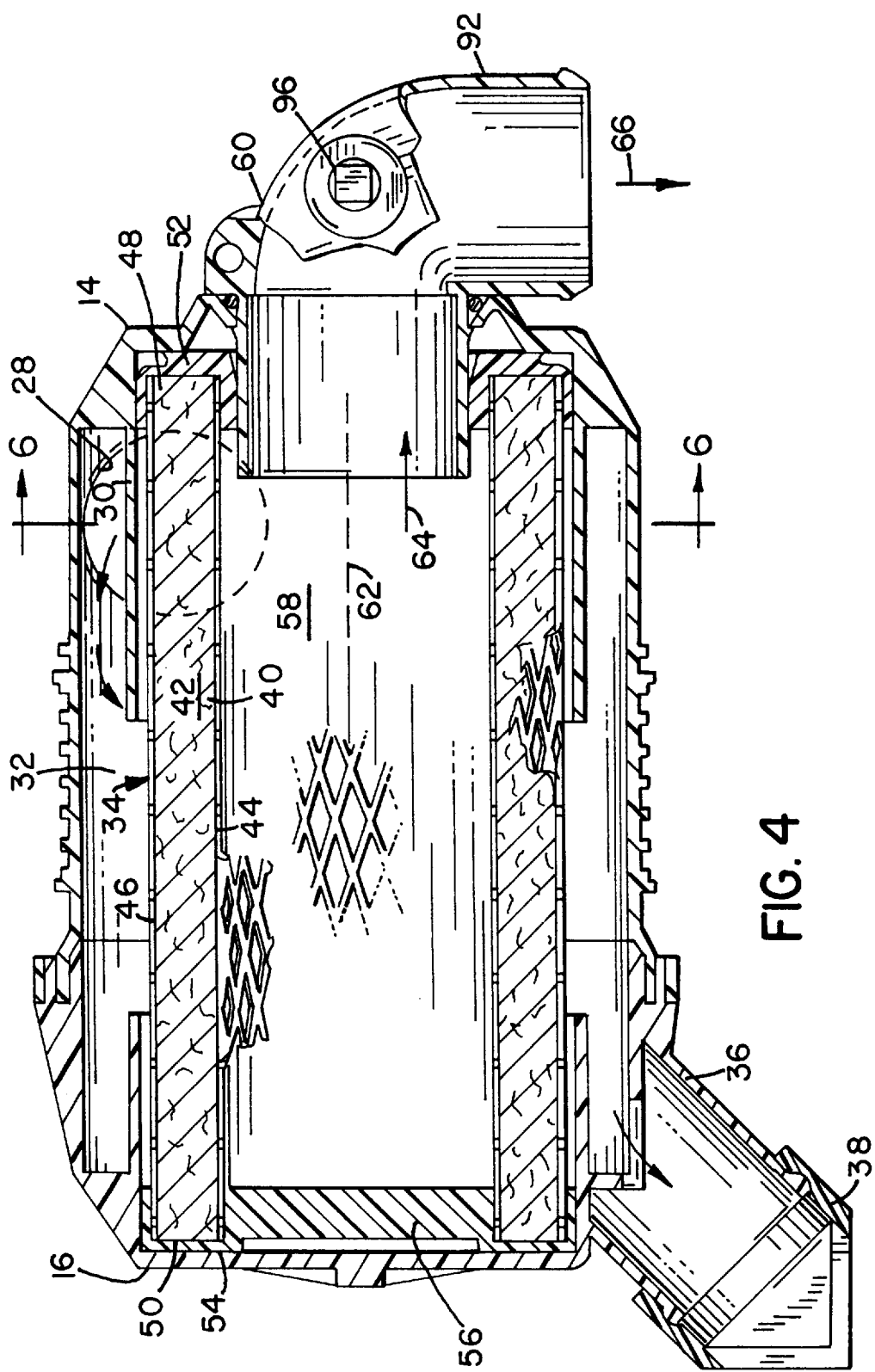
FIG. 4 is an enlarged sectional view of the filter of FIG. 1.
Figure 5:
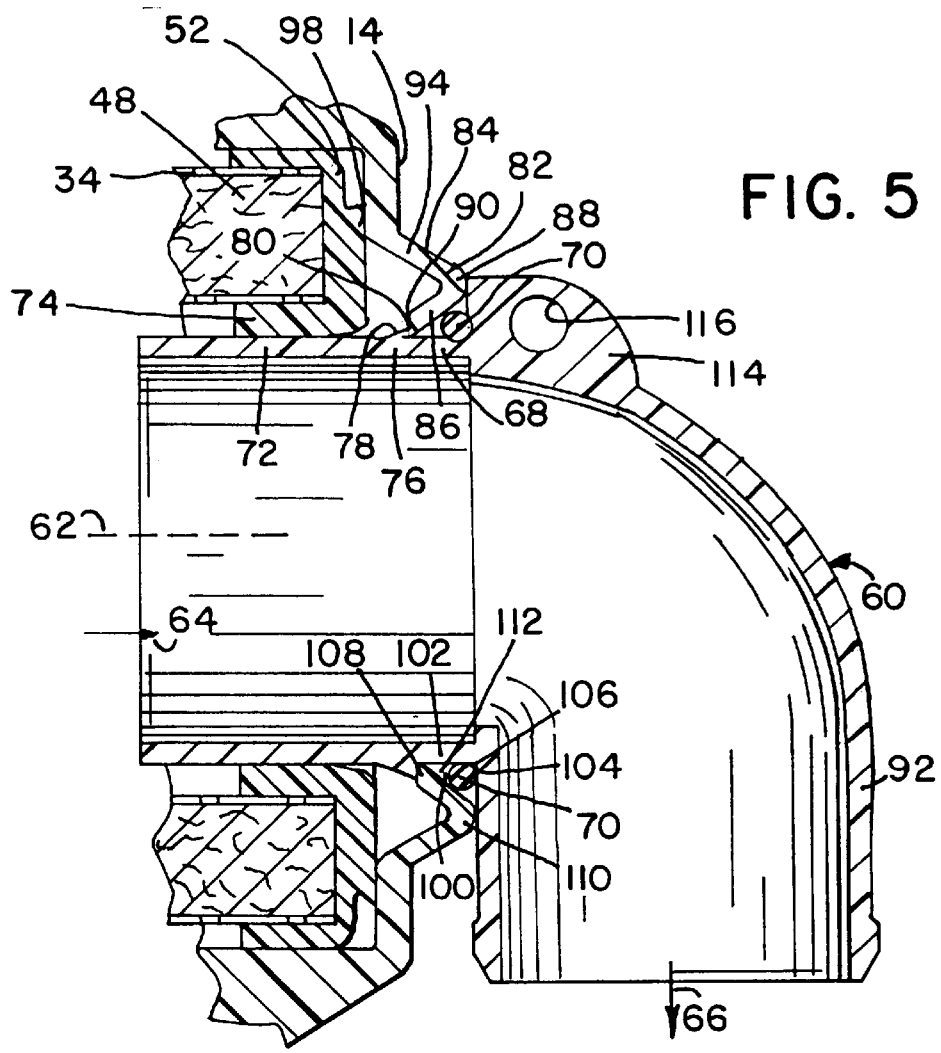
FIG. 5 is an enlarged sectional view of a portion of the structure of FIG. 4.

Referring to FIG. 5, plastic outlet tube 60 is mounted to axial end 14 of housing 10 in snap-in relation and is rotatable relative thereto about the axis 62 of cylindrical filter element 34 and communicates with hollow interior 58, FIG. 4, of filter element 34 for exhausting the clean filtered air therefrom, as shown at arrows 64 and 66. Outlet tube 60 includes a first portion 68 extending through axial end 14 of housing 12 in sealed relation at seal 70, which is a rubber O-ring. Outlet tube 60 includes a second portion 72 extending through axial end 48 of cylindrical filter element 34 in sealed relation at seal 74 provided by rubber end cap 52. Portions 68 and 72 are coaxial along the axis 62 of cylindrical filter element 34. Outlet tube 60 includes a third portion 76 engaged by axial end 14 of housing 12 in the noted snap-in relation. Portion 76 is axially between portions 68 and 72. Portion 76 includes an outer tapered surface 78 leading to a shoulder 80 having an outer diameter larger than that of each of portions 68 and 72. Portions 68 and 72 have the same outer diameter. Portions 68, 72 and 76 each have the same inner diameter.

Axial end 14 of housing 12 has a V-shape 82 in section, FIGS. 4 and 5, including a pair of legs 84 and 86 converging towards each other to a bight 88 pointing axially rightwardly in FIG. 5 away from cylindrical filter element 34. Outlet tube 60 is engaged in the noted snap-in relation by leg 86 at the end 90 of leg 86 opposite bight 88. Outlet tube 60 is pushed axially leftwardly in FIGS. 4 and 5 into the housing, such that end 90 of leg 86 flexes slightly radially outwardly as it rides along taper 78, and then snaps back radially inwardly in engagement along shoulder 80. Outlet tube 60 includes outer portion 92 providing a 90° elbow relative to portions 68, 76, 72, to provide different orientations of air flow direction 66 upon rotation of outlet tube 60 about axis 62 after the noted snap-in insertion. Outlet tube 60 thus has a raised annular shoulder 80 engaged by end 90 of leg 86 in the noted snap-in relation. Shoulder 80 is radially aligned with and radially spaced inwardly of the end 94 of the other leg 84 opposite bight 88. Shoulder 80 is axially between axial end 48 of cylindrical filter element 34 and end 90 of leg 86. Outlet tube 60 at elbow 92 may include a vent outlet at 96, FIG. 4, if desired.

Seal 74, FIG. 5, is radially engaged between outlet tube 60 and cylindrical filter element 34 in radial sealed relation. Rubber end cap 52 also provides a seal 98 axially engaged between axial end 48 of cylindrical filter element 34 and axial end 14 of housing 12 in axial sealed relation. Seal 70 is engaged between outlet tube 60 and axial end 14 of housing 12 in sealed relation. Seal 70 is radially engaged between outlet tube 60 and axial end 14 of housing 12 in radial sealed relation and is also axially engaged between outlet tube 60 and axial end 14 of housing 12 in axial sealed relation such that seal 70 provides both axial and radial sealing. Leg 86 of V-shaped portion 82 of axial end 14 of housing 12 provides a ramp surface 100 extending obliquely relative to axis 62 of cylindrical filter element 34. Seal 70 is engaged between ramp surface 100 and outlet tube 60. Outlet tube 60 includes a first radially facing surface 102 engaging seal 70 such that seal 70 is radially engaged between surface 102 and ramp surface 100. Outlet tube 60 includes a second axially facing surface 104 engaging seal 70 such that seal 70 is axially engaged between surface 104 and ramp surface 100. In this manner, seal 70 provides both radial and axial sealing.

First and second surfaces 102 and 104 meet at a 90° interface point 106 on the opposite side of seal 70 from ramp surface 100. Meeting point or junction 106 defines a first point of a triangle as viewed in section in FIG. 5. Leg 86 has the noted end 90 opposite bight 88 and proximate outlet tube 60 along surface 102 and defining a second point 108 of the triangle. Bight 88 is proximate outlet tube 60 along surface 104 and defines a third point 110 of the triangle. There is thus defined a triangle 112 having a first side along first surface 102 between first and second points 106 and 108, a second side along ramp surface 100 between second and third points 108 and 110, and a third side along second surface 104 between third and first points 110 and 106. Seal 70 is trapped in triangle 112. The seals prevent contaminated air from bypassing filter element 34, and ensure that air entering at air inlet opening 28 must pass through and be filtered by filter element 34 before reaching outlet tube 60 at 64. Seal 70 makes the redundancy of seals 74 and 98 possible, which is desirable.

Outlet tube 60 includes a tab 114 with an aperture 116 therethrough for securement to some mounting location in a truck engine compartment or the like, for holding elbow portion 92 in the desired rotated position about axis 62.

It is recognized that various equivalents, alternatives and modifications are possible within the scope of the appended claims.

We claim:

1. An air filter comprising:

a housing having distally opposite axial ends;

a cylindrical filter element in said housing, said cylindrical filter element having an annular sidewall with a hollow interior and extending between distally opposite axial ends, wherein air flows radially inwardly through said annular sidewall into said hollow interior and then axially through said hollow interior;

an outlet tube mounted to one of said axial ends of said housing in snap-in relation and rotatable relative thereto about the axis of said cylindrical filter element and communicating with said hollow interior of said cylindrical filter element for exhausting air therefrom.

2. The air filter according to claim 1 wherein said outlet tube includes:

a first portion extending through said one axial end of said housing in sealed relation;

a second portion extending through one of said axial ends of said cylindrical filter element in sealed relation.

3. The air filter according to claim 2 wherein said first and second portions are coaxial along said axis of said cylindrical filter element.

4. The air filter according to claim 3 wherein said outlet tube includes:

a third portion engaged by said one axial end of said housing in said snap-in relation;

wherein said third portion is axially between said first and second portions.

5. The air filter according to claim 4 wherein said third portion has an outer diameter larger than that of each of said first and second portions.

6. The air filter according to claim 5 wherein said first, second and third portions each have the same inner diameter.

7. The air filter according to claim 5 wherein said first and second portions have the same outer diameter.

8. The air filter according to claim 1 wherein:

said one axial end of said housing has a V-shape in section, including a pair of legs converging towards each other to a bight pointing axially away from said cylindrical filter element;

said outlet tube is engaged in said snap-in relation by one of said legs at the end of said one leg opposite said bight.

9. The air filter according to claim 8 wherein said one leg is shorter than the other of said legs.

10. The air filter according to claim 9 wherein:

said outlet tube has a raised annular shoulder engaged by said end of said one leg in said snap-in relation;

said shoulder is radially aligned with and radially spaced inwardly of the end of the other of said legs opposite said bight.

11. The air filter according to claim 10 wherein said shoulder is axially between one of said axial ends of said cylindrical filter element and said one end of said one leg.

12. The air filter according to claim 1 wherein:

said one axial end of said housing has a pair of legs, one of which has an end which is slightly radially flexible;

said outlet tube has an annular shoulder engaged by said end of said one leg in said snap-in relation.

13. The air filter according to claim 12 wherein said shoulder is radially aligned with and radially spaced inwardly of the other of said legs.

14. The air filter according to claim 12 wherein said shoulder is axially between one of said axial ends of said cylindrical filter element and said end of said one leg.

15. A air filter comprising:

a housing having distally opposite axial ends;

a cylindrical filter element in said housing, said cylindrical filter element having an annular sidewall with a hollow interior and extending between distally opposite axial ends, wherein air flows radially inwardly through said annular sidewall into said hollow interior and then axially through said hollow interior;

an outlet tube extending axially through one of said axial ends of said housing and communicating with said hollow interior of said cylindrical filter element for exhausting air therefrom;

a first seal axially engaged between one of said axial ends of said cylindrical filter element and said one axial end of said housing in axial sealed relation;

a second seal engaged between said outlet tube and said one axial end of said housing in sealed relation.

16. The air filter according to claim 15 comprising a third seal radially engaged between said outlet tube and said cylindrical filter element in radial sealed relation.

17. The air filter according to claim 15 wherein in combination said second seal is radially engaged between said outlet tube and said one axial end of said housing in radial sealed relation and is also axially engaged between said outlet tube and said one axial end of said housing in axial sealed relation such that said second seal provides both axial and radial sealing.

18. A air filter comprising:

a housing having distally opposite axial ends;

a cylindrical filter element in said housing, said cylindrical filter element having an annular sidewall with a hollow interior and extending between distally opposite axial ends, wherein air flows radially inwardly through said annular sidewall into said hollow interior and then axially through said hollow interior;

an outlet tube extending axially through one of said axial ends of said housing and communicating with said hollow interior of said cylindrical filter element for exhausting air therefrom;

a first seal radially engaged between said outlet tube and said cylindrical filter element in radial sealed relation;

a second seal engaged between said outlet tube and said one axial end of said housing in sealed relation.

19. The air filter according to claim 18 comprising a third seal axially engaged between one of said axial ends of said cylindrical filter element and said one axial end of said housing in axial sealed relation.

20. The air filter according to claim 18 wherein in combination said second seal is radially engaged between said outlet tube and said one axial end of said housing in radial sealed relation and is also axially engaged between said outlet tube and said one axial end of said housing in axial sealed relation such that said second seal provides both axial and radial sealing.

21. A air filter comprising:

a housing having distally opposite axial ends;

a cylindrical filter element in said housing, said cylindrical filter element having an annular sidewall with a hollow interior and extending between distally opposite axial ends, wherein air flows radially inwardly through said annular sidewall into said hollow interior and then axially through said hollow interior;

an outlet tube extending axially through one of said axial ends of said housing and communicating with said hollow interior of said cylindrical filter element for exhausting air therefrom;

a seal engaged between said outlet tube and said one axial end of said housing in sealed relation;

a ramp surface on said one axial end of said housing extending obliquely relative to the axis of said cylindrical filter element, said seal being engaged between said ramp surface and said outlet tube.

22. The air filter according to claim 21 wherein said outlet tube includes:

a first radially facing surface engaging said seal such that said seal is radially engaged between said first surface and said ramp surface;

a second axially facing surface engaging said seal such that said seal is axially engaged between said second surface and said ramp surface;

such that said seal provides both radial and axial sealing.

23. The air filter according to claim 22 wherein said first and second surfaces meet at a 90° interface on the opposite side of said seal from said ramp surface.

24. The air filter according to claim 22 wherein said one axial end of said housing has a V-shape in section, including a pair of legs converging towards each other to a bight pointing axially away from said cylindrical filter element, and wherein one of said legs provides said ramp surface.

25. The air filter according to claim 24 wherein said one leg engages said outlet tube in snap-in relation and permitting rotation of said outlet tube relative to said housing about the axis of said cylindrical filter element.

26. The air filter according to claim 24 wherein:

said first and second surfaces meet at a junction defining a first point of a triangle;

said one leg has an end opposite said bight and proximate said outlet tube along said first surface and defining a second point of said triangle;

said bight is proximate said outlet tube along said second surface and defines a third point of said triangle;

said triangle has a first side along said first surface between said first and second points, a second side along said ramp surface between said second and third points, and a third side along said second surface between said third and first points;

said seal is trapped in said triangle.

* * * * *